United States Patent
Imbert De Tremiolles et al.

(10) Patent No.: US 6,622,135 B1
(45) Date of Patent: Sep. 16, 2003

(54) METHOD FOR DETECTING AND CLASSIFYING ANOMALIES USING ARTIFICIAL NEURAL NETWORKS

(75) Inventors: Gislain Imbert De Tremiolles, Saint Paul (FR); Pascal Tannhof, Fontainebleau (FR); Erin Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,088

(22) Filed: Dec. 16, 1999

(30) Foreign Application Priority Data

Dec. 29, 1998 (EP) .............................................. 98480094

(51) Int. Cl.[7] ................................................ G06N 3/06
(52) U.S. Cl. .............................. 706/20; 706/25; 340/572
(58) Field of Search ..................... 706/20, 25; 382/128, 382/149, 159, 225; 340/572

(56) References Cited

U.S. PATENT DOCUMENTS

| | | | | |
|---|---|---|---|---|
| 5,331,550 A | * | 7/1994 | Stafford et al. | 382/128 |
| 5,359,671 A | * | 10/1994 | Rao | 382/225 |
| 5,455,892 A | * | 10/1995 | Minot et al. | 706/25 |
| 5,465,308 A | * | 11/1995 | Hutcheson et al. | 382/159 |
| 5,537,094 A | * | 7/1996 | Bettine et al. | 340/572.4 |
| 5,544,256 A | * | 8/1996 | Brecher et al. | 382/149 |
| 5,568,591 A | * | 10/1996 | Minot et al. | 706/25 |

* cited by examiner

Primary Examiner—Wilbert L. Starks, Jr.

(57) ABSTRACT

To avoid the problem of category assignment in artificial neural networks (ANNs) based upon a mapping of the input space (like ROI and KNN algorithms), the present method uses "probabilities". Now patterns memorized as prototypes do not represent categories any longer but the "probabilities" to belong to categories. Thus, after having memorized the most representative patterns in a first step of the learning phase, the second step consists of an evaluation of these probabilities. To that end, several counters are associated with each prototype and are used to evaluate the response frequency and accuracy for each neuron of the ANN. These counters are dynamically incremented during this second step using distances evaluation (between the input vectors and the prototypes) and error criteria (for example the differences between the desired responses and the response given by the ANN). At the end of the learning phase, a function of the contents of these counters allows an evaluation of these probabilities for each neuron to belong to predetermined categories. During the recognition phase, the probabilities associated with the neurons selected by the algorithm permit the characterization of new input vectors and more generally any kind of input (images, signals, sets of data) to detect and classify anomalies. The method allows a significant reduction in the number of neurons that are required in the ANN while improving its overall response accuracy.

3 Claims, 7 Drawing Sheets

METHOD FOR DETECTING AND CLASSIFYING ANOMALIES USING ARTIFICIAL NEURAL NETWORKS

FIELD OF INVENTION

The present invention relates to neural networks in general and more particularly to a method of detecting and classifying anomalies in images/signals/sets of data using artificial neural networks and novel artificial neural networks resulting therefrom.

BACKGROUND OF THE INVENTION

Detecting anomalies such as abnormalities or singularities in images, signals, and sets of data is an every day occurrence for some professions. For example, as far as images are concerned, consider a laboratory researcher analyzing microscope's images containing foreign organisms or a photographer pouring over photos to find a flaw. Using the human eye, this process can prove painstaking and time consuming. The process can be further complicated when a particular anomaly represents a defect in part of an image, but not in others. Artificial neural networks appear to be perfectly adapted to handle this problem because they present the essential advantage of real time processing (particularly when implemented in hardware) and adaptation. Before going further, it is important to understand the principles that are at the base of artificial neural networks.

To date, some artificial neural networks are hardware implementations of the Region Of Influence (ROI) and/or the K Nearest Neighbor (KNN) algorithms. The physical implementation of such an artificial neural network provides a high degree of parallelism and adaptation, i.e. the ability to learn any type of input data, typically an input pattern or vector. This type of artificial neural network is schematically represented in FIG. 1 and will be referred to herein below as an ANN. The ANN referenced 10 in FIG. 1 is comprised of a logical decision unit and three layers: an input layer, an internal (or hidden) layer and an output layer. Each node of the internal layer is a processing unit which computes the distance between the input pattern which is presented to the input layer and the example which is stored within each node thereof. The learned data (or example) stored in each node of the internal layer is referred to as a prototype. The logical decision unit determines either the neuron which fired or the neuron which is the nearest neighbor (closest prototype) depending upon the algorithm being used. The output layer returns the appropriate categories (i.e. the categories associated to the neurons selected by the logical decision unit).

A conventional method of finding an anomaly (typically a defect) in an image is to input the entire image into the ANN, to compare it with reference images containing characteristic defects. To each of these images is associated a category characterizing the contained defect. For instance, during the production of semiconductor ICs, wafer maps are used to give a visual representation of the test and yield results. FIG. 2 shows wafer maps referenced 11-1, 11-2, 11-3 and 11-4 for four different wafers, each with a pattern of defective chips. Each one of the first three patterns constitutes a "defect" for the process engineer but not the last one, because in this case the pattern is not characteristic of a specific IC fabrication process defect. These defects, at random, cannot be exploited by the process engineer to improve fabrication yields. As apparent in FIG. 2, a binary representation of each wafer map can be given, for instance, a 0 (white) for a good chip and a 1 (black) for a bad chip. However, it should be understood that this could be generalized, for instance by assigning a value comprised between 0 and 255 by a 8-bits coding. The analysis of these patterns (shape, location, number of defective chips, . . . ) is of paramount importance to the process engineer. The same defect can be correlated from a number of wafer maps and can lead to the accurate identification of its faulty origin (process, equipment, . . . ) to allow the adequate corrective action.

However upon further reflection, a difficulty concerning the volume of the data to be memorized in the ANN arises. To create a representative database of the images on hand using this method, it would be necessary to input many variations of the same defect. Under this conventional method even though some images might differ only slightly, the user is obligated to input the entire image into the database as references for subsequent comparisons. As a matter of fact, assume the ANN has learned the wafer map 11-1 with a category of defect A and the wafer map 11-3 with a category of defect B. Now wafer map 11-2 is presented for classification, it will be identified as close to the category of defect A of wafer map 11-1 when it should have been classified in category B. This mistake is due to the location of the pattern of defective chips on wafer map 11-2. The defects location on wafer map 11-2 is closer to that of wafer map 11-1 to that of wafer map 11-3, even the pattern is identical to the latter and quite different from the former. Similarly when learning the totality of an image, it is necessary to classify the entire image as containing or not containing a defect (and possibly the kind of defect), when often in reality, the defect is only a small part of the image. Take again the example of the wafer maps 11-2 and 11-3 in FIG. 2, the pattern of defective chips (marked in black) in each wafer map is a well localized defect which characterizes a process problem.

The aim of the classical method based on such ANNs is to associate with each prototype a category to identify it. The main drawbacks of this approach are the number and the size of the necessary prototypes. Because to obtain good results, it is necessary to learn many prototypes and to memorize all possible anomalies in every possible location. A possible solution to avoid this storage problem is to perform a local analysis, but then, the main drawback of this method would be ambiguity: from time to time a pattern would represent or not an anomaly depending upon its neighborhood, a problem which occurs when a prototype does not characterize an anomaly, or when the user does a bad category assignment to a prototype.

SUMMARY OF THE PRESENT INVENTION

It is therefore a primary object of the present invention to provide a method for detecting and classifying anomalies in images/signals/sets of data using artificial neural networks (ANNs) and ANNs resulting therefrom.

It is another object of the present invention to provide a method for detecting and classifying anomalies in images/signals/sets of data using artificial neural networks (ANNs) which allows a significant reduction of the number of input vector/pattern components required for each neuron and of the number of required neurons.

It is another object of the present invention to provide a method for detecting and classifying anomalies in images/signals/sets of data using artificial neural networks (ANNs) which improves the neurons response accuracy.

It is still another object of the present invention to provide a method for detecting and classifying anomalies in images/ signals/sets of data using artificial neural networks (ANNs) which improves the learning process by reducing the influence of errors or ambiguities of the user.

The accomplishments of these and other related objects is achieved by the method of the present invention, the main goals of which is to reduce the number of required neurons, to limit the size of the memory in each neuron by reducing the number of the required prototype components, and to improve their response accuracy in an ANN based upon a space mapping algorithm, such as the ROI or KNN algorithm. This invention finds applications in the field of anomaly detection and classification on images, signals, and sets of data. The method of the present invention is based upon "probabilities". Now, a prototype does not represent a category any more, but the "probability" to belong to one (or several) category. This probability is determined from the neuron's response accuracy and frequency which are stored in two counters. Thus, after having computed the "probability" of each pattern of the image, signal or set of data, a second analysis is done to classify said pattern using its computed "probability" and the "probability" of all the neighboring patterns. To perform these two steps, two ANNs are used. The first one to which the incoming image, signal or set of data is presented evaluates the "probabilities" and the second one, based upon these resulting "probabilities" classifies each part of said incoming image, signal or set of data. Basically, the method of the present invention requires two phases as standard with ANNs: a learning phase and a recognition phase, but because two ANNs are now used, each of these phases is divided in two parts or sub-phases, one concerning the first ANN and the other concerning the second one.

According to one of its broadest aspect, the method incorporates an analysis phase which comprises the steps of:
- generating patterns of data from a first sub-set of said set of data;
- presenting said patterns of data to the ANN;
- selecting the most representative patterns of data for memorization in the ANN as prototypes;
- calculating for each prototype the probabilities that these selected patterns of data characterize said categories;
- generating patterns of data from a second sub-set of said set of data; and,
- performing the analysis of said patterns of data of the second sub-set using said representative patterns and said probabilities.

The novel features believed to be characteristic of this invention are set forth in the appended claims. The invention itself, however, as well as these and other related objects and advantages thereof, will be best understood by reference to the following detailed description to be read in conjunction with the accompanying drawings.

DESCRIPTION OF THE PREFERRED EMBODIMENT

Let us assume that we want to begin the learning phase of certain characteristics of a plurality of images of a first type, generically referenced $I_l$ ($_l$ stands for "learning"), stored in a data base. Instead of inputting the totality of an image into the ANN for processing as it has been practiced so far, according to the method of the present invention, the image is first divided into sub-images in order to perform a step by step local analysis of the whole image. To that end, a first data base which contains representative sub-images and the probability of belonging to a predetermined category associated thereto is created.

Figure 3:
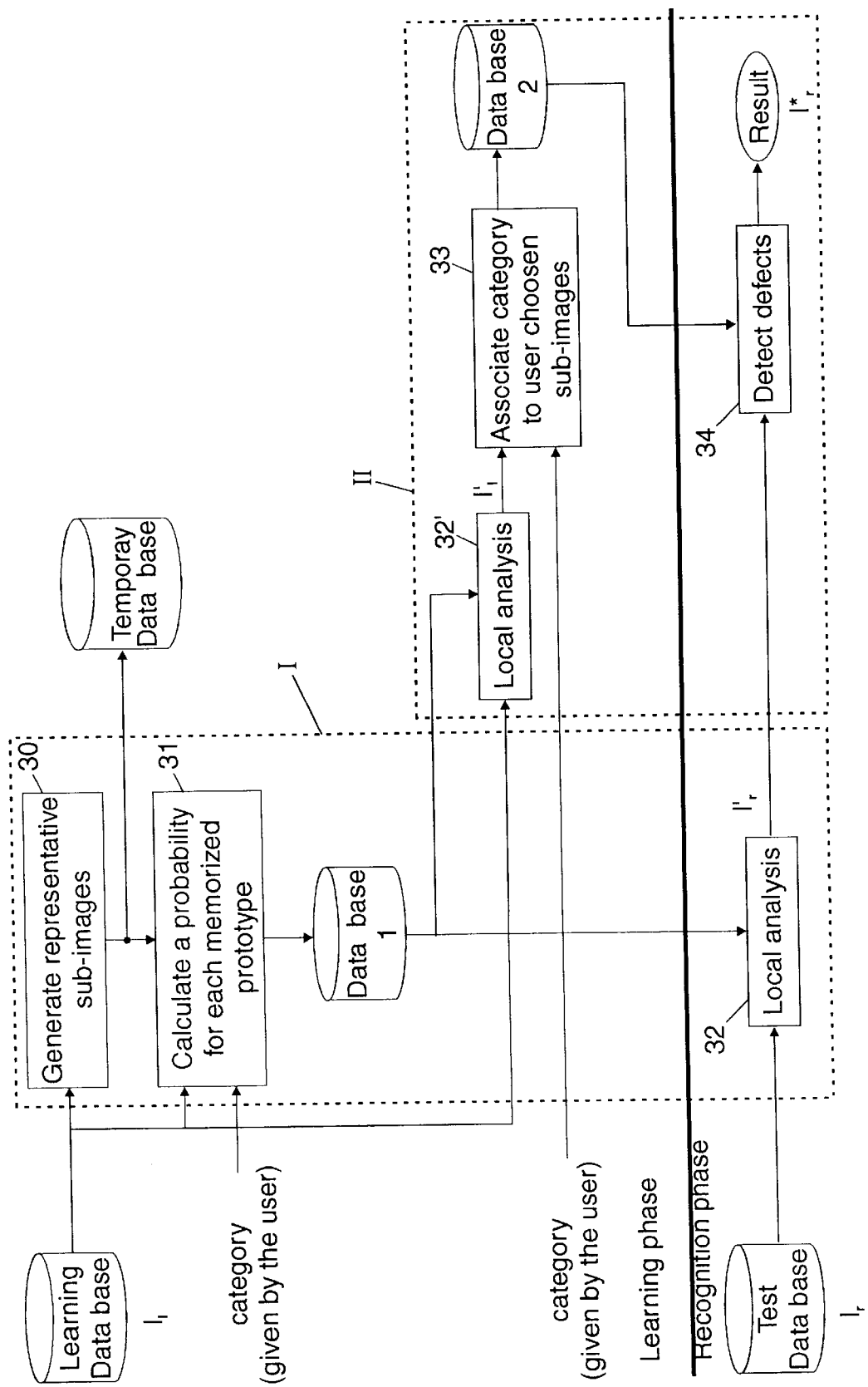
FIG. 3 shows the essential steps of the novel algorithm to implement the learning and recognition phases according to the method of the present invention.

Now turning to FIG. 3 which schematically illustrates this novel approach. Images on which the learning is performed are stored in a data base referenced Learning Data base. In essence during this learning phase, the first step consists of generating said representative sub-images (box 30) and storing the results in a temporary data base. The second step consists of calculating this probability of each prototype (box 31). The resulting data is stored in a data base referenced Data base 1 in FIG. 3. These representative sub-images are also used as prototypes in a first ANN. Sub-images stored in Data base 1 can now be used to characterize new images of the first type, not stored in said Learning Data base, to search for a potential local defect therein. These new images, now referred to as $I_{r \circledR}$ stands for "recognition") are stored in another data base referred to as the Test Data base. During the recognition phase, a local analysis is performed by comparing each part of a new image with the prototypes (box 32). As a result of this local analysis performed during this comparison, an image of a second type, referred to as $I'_r$, is created. The value of each point of this image $I'_r$ of a second type corresponds to the probability of the closest sub-image to belong to a predetermined category based upon the result of the comparison. This terminates a first phase referred to herein below as Phase I. At the end of Phase I, these images I are thus transformed into other images I' representing the probabilities of the presence or not of defects (and possibly the type of defects).

In a second phase (Phase II), the obtained images I' of the second type are used to detect, classify, and localize defects on corresponding images of the first type. To that end, a second ANN is used, and a second data base is created which contains sub-images of said images of the second type to which are associated a category characterizing the presence or not of defects, and the kind of defects as defined by the user. The same local analysis as described above by reference to box 32 is now conducted on the images stored in the Learning Data base instead of the Test Data base. This local analysis is performed to produce another set of images $I'_1$ of the second type (box 32'). Next, sub-images are extracted from said images $I'_1$ by the user who assigns said category to them (box 33). The corresponding data, i.e. the sub-images and the category associated thereto are stored in another data base referenced Data base 2. Data base 2 is used in the second ANN to detect defects on images $I'_r$ of the second type, since it allows the comparison between each part of these images with the sub-images stored therein (box 34). As a final result, there is produced an image of a third type I* showing the defects, typically a binary image wherein, for instance, the black part indicates the presence of a defect when a white part indicates the absence of a defect. A color image could also be produced to show the kind of defects (each color characterizes a kind of defect) in addition to their locations. Such images I* are of great value for the process engineer.

Figure 4A:
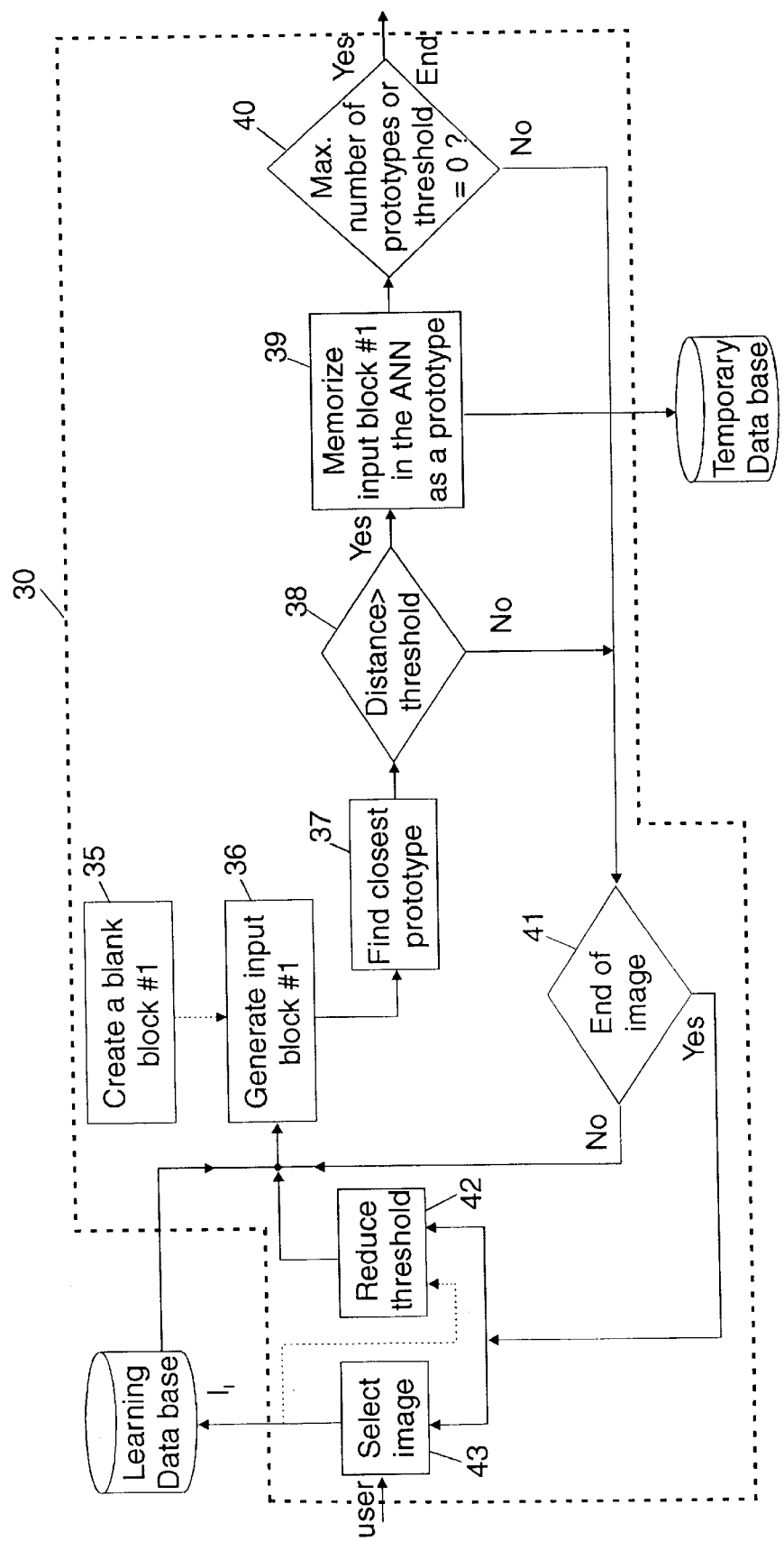
FIG. 4 is comprised of FIGS. 4A, 4B and 4C which show the steps composing boxes 30, 31 and 32 of FIG. 3 corresponding to sub-phases Ia, Ib and Ic of Phase I respectively.
Figure 4B:
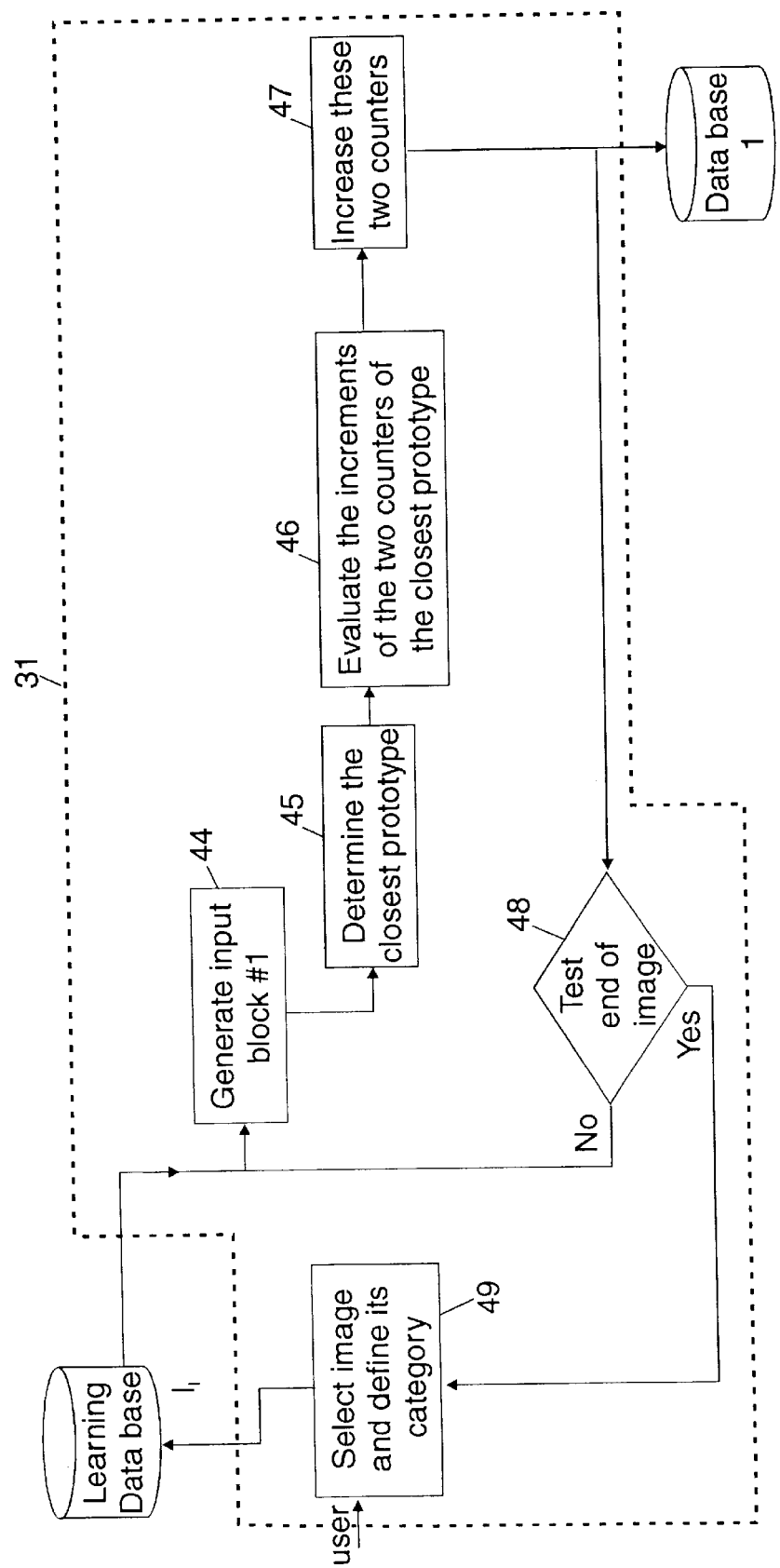
Figure 4C:
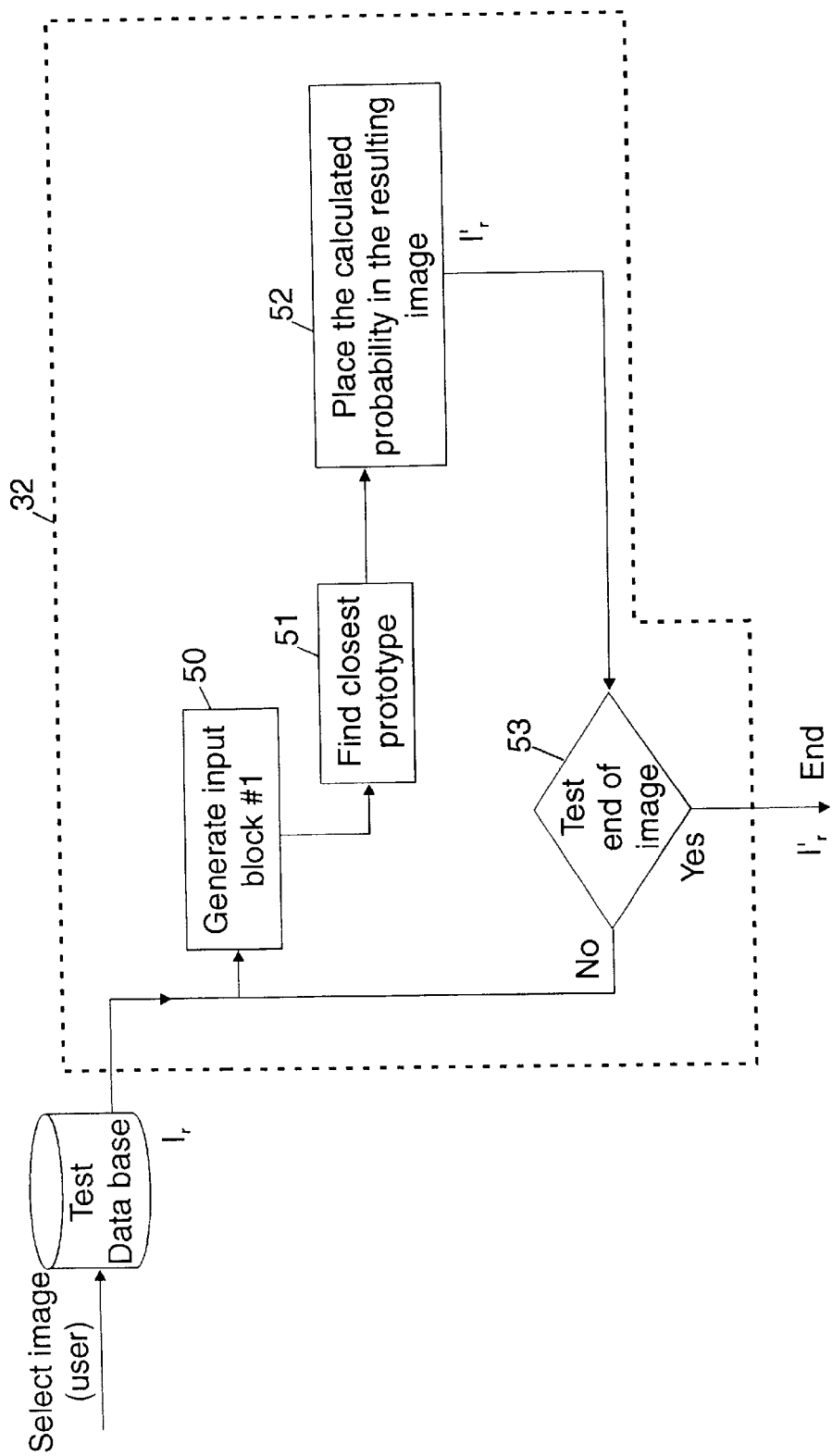

Let us provide more details of Phase I in conjunction with FIG. 4. FIG. 4 is comprised of FIGS. 4A, 4B and 4C which are related to the three sub-phases of Phase I, referenced Ia and Ib (both belonging to the learning phase) and Ic (belonging to the recognition phase). Now turning to FIG. 4A, it describes the essential steps of box 30 of FIG. 3 in the form of an algorithm still referenced 30, corresponding to sub-phase Ia which aims to generate representative sub-images. Images I of the first type that will be used for sub-phase Ia are stored in the Learning Data base. As mentioned above, according to the present invention, the images are divided in sub-images. First, to that end, we create a small blank block that is adapted to process the totality of said images I of a first type (step 35). This blank block of a first type will be referred to herein below as blank block #1. Then the blank block #1 will "walk" through the image, step by step, to cover it in totality without omitting any part thereof. At each step, the blank block #1 is used to make a "photograph" of a part of the image, i.e. a sub-image, to generate network input, generically referred to herein below as the "input block #1" (step 36). The objective of this sub-phase Ia is to memorize the most diverse and representative input blocks #1 to represent as many different sub-images as possible. To achieve this diversity, all the input blocks #1 are sent to the first ANN in order to evaluate the distance Dist between the prototypes and the input block #1, to find the closest prototype (step 37), and to compare the distance Dist with a threshold. This threshold is determined empirically regarding the type of images I to be processed to limit the similarity of the prototypes). Now the distance with the closest prototype is compared with this threshold (step 38). If the distance Dist is greater than the threshold, the corresponding input block #1 is stored in the first ANN as a prototype (step 39) and in a temporary data base referred to as the Temporary Data base. Now a test is performed to determine whether the maximum number of permitted prototypes has been reached, which would mean that the most representative sub-images have been found and stored in the first ANN and in the Temporary Data base, or if the threshold is equal to zero, that is all of the sub-images of the current image I have been memorized (step 40). If neither of the above conditions are met and the end of image I is not detected (step 41), the above step sequence is repeated, until the totality of the image I has been presented to the first ANN. However, once this image has been fully processed, the above step sequence may be repeated with a lower threshold (step 42) if we want to learn more representative input blocks #1 on the same image. Alternately, another image of the Learning Data base is selected (step 43). In this case, the threshold reduction may be performed or not. Finally, at the end of this sub-phase Ia, all the input blocks #1 that have been selected are stored in the first ANN and in the Temporary Data base. The memorized sub-images in this Temporary Data base are representative of all the sub-images that may be found in the said plurality of images I of the first type.

Figure 1:
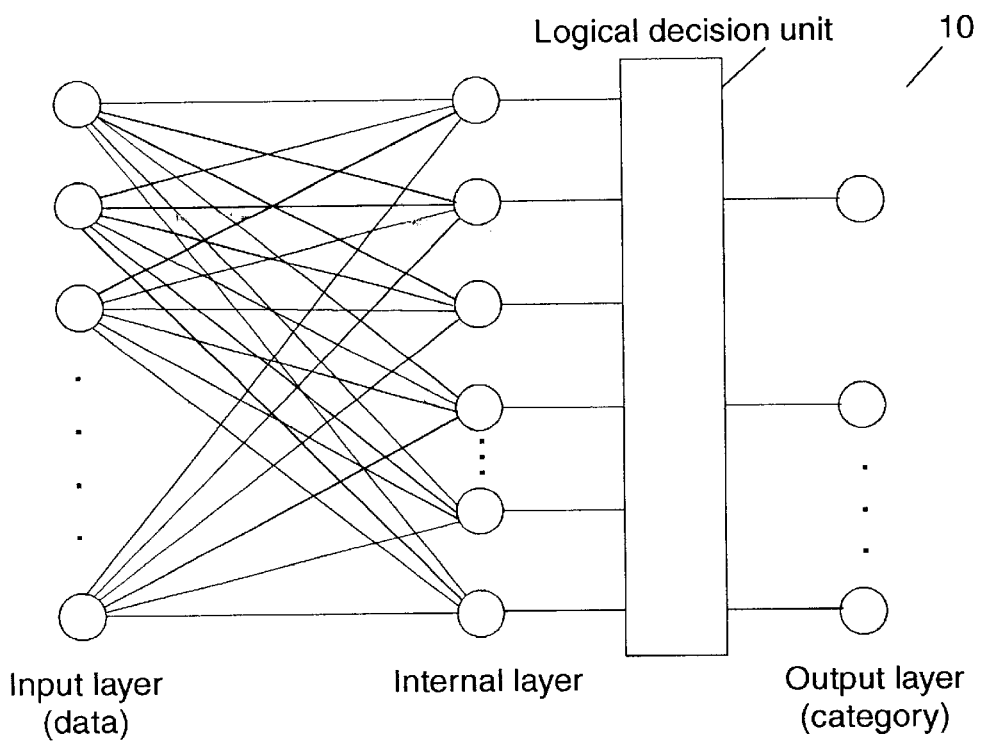
FIG. 1 shows the basic topology of an artificial neural network implementing either the ROI or KNN algorithm.
Figure 2:
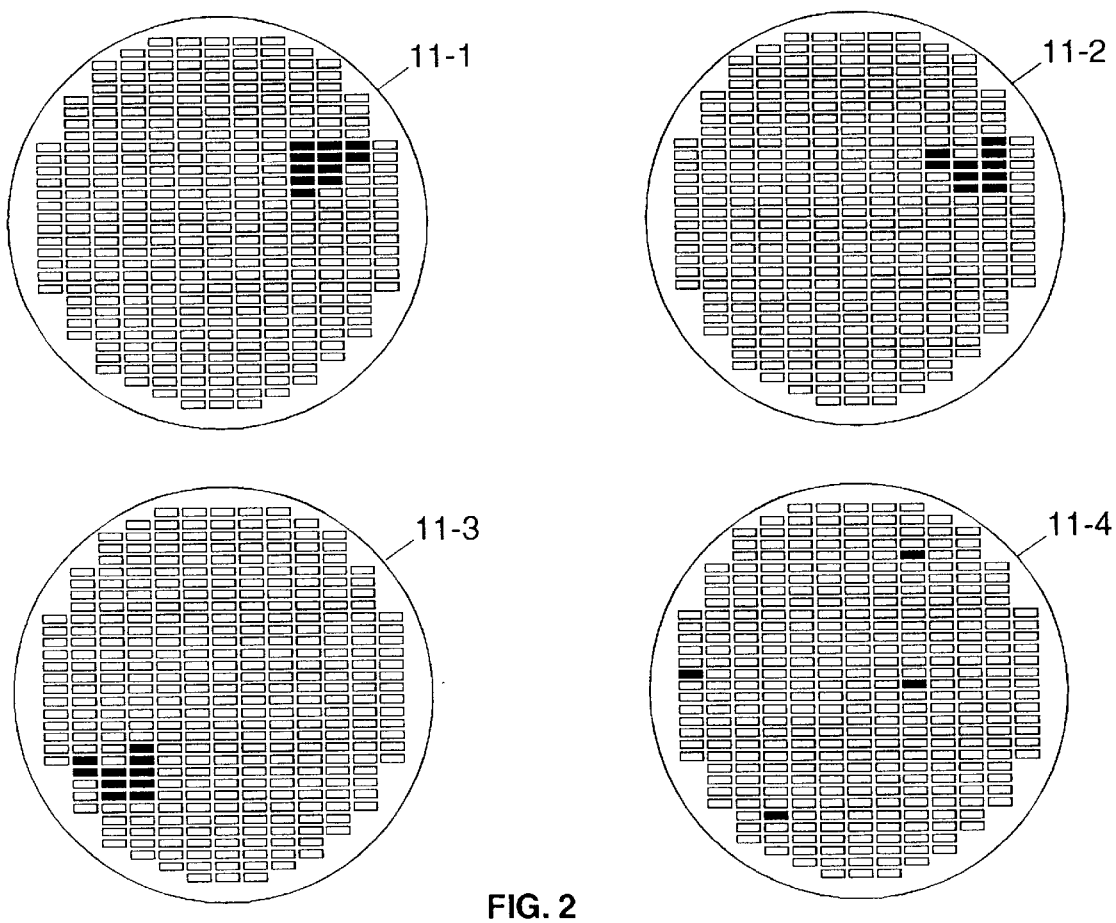
FIG. 2 shows four different wafer maps having different patterns of defective chips.
Figure 5:
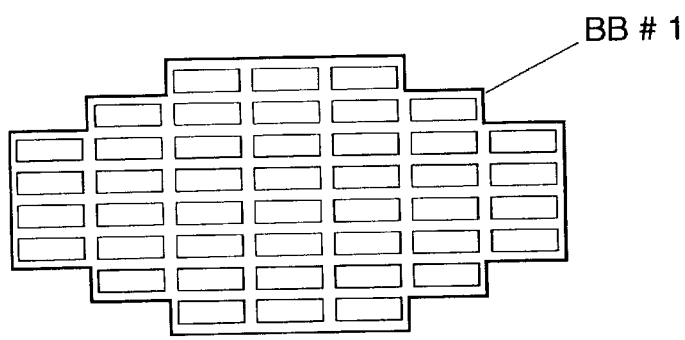
FIG. 5 illustrates a small "blank block" of a first type (blank block #1) adapted to "walk" through the wafer maps of FIG. 2.
Figure 6:
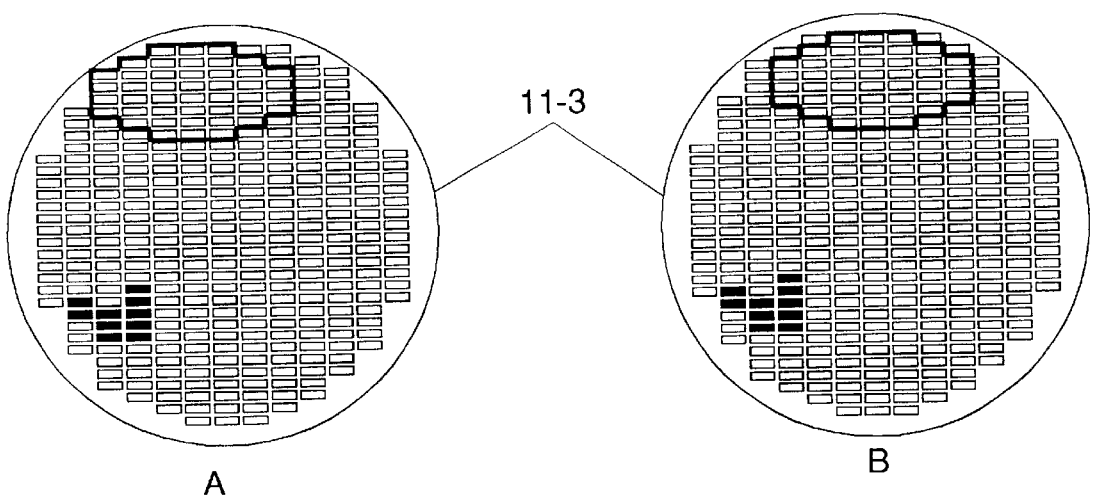
FIG. 6 shows the blank block #1 of FIG. 5 in two successive positions as it walks through wafer map 11-3 of FIG. 2.

Using the previous example of IC production, FIG. 5 shows the blank block #1 referenced BB#1, the shape of which has been designed to walk through the wafer maps 11-1, 11-2, 11-3 and 11-4 of FIG. 2. It examines all the chips within the limits of blank block #1, forty four chips at a time. This design allows the analysis of each part of the wafer map, so that, none of the chips will be omitted. FIG. 6 illustrates how the blank block #1 walks through the wafer map 11-3 of FIG. 2 in the first two successive steps to generate input blocks #1-1 and #1-2. All the input blocks #1 once generated are presented to the first ANN to identify those to be learned (stored as prototypes in the ANN). An input block #1 is learned and memorized in the Temporary Data base if the distance between itself and the closest prototype is greater than the threshold mentioned above. The "walk" process is continued the appropriate number of steps until either the whole wafer map is examined or the number of permitted prototypes is reached. Now once we have created the Temporary Data base, to avoid the difficulty of category assignment for each prototype and because a sub-image may be classified in different categories depending on its neighborhood, a "probability" of representing or not representing a defect (and possibly the type of defects) is associated with each prototype. For the sake of simplicity, a category is assigned to each prototype, and the probability is used to evaluate the confidence degree of this assignment. For that purpose, two counters (or more) are put in place for each prototype. The first counter is used to count the response frequency of the associated prototype, i.e. the result of a function of all the distances between this prototype and all the input data. The second counter is used to evaluate the accuracy of the prototype by using the result of a function of the distance (between this prototype and all the input data) and the response error of this prototype (which corresponds to the difference between the response given by this prototype and the desired response). For the sake of simplicity, it is possible to use the first counter to count the number of times the associated prototype is the nearest neighbor to the input data. The second counter is used to count the number of times the associated prototype is the closest to the input data and the category of this prototype is the same as the one given by the user for the whole image. Thus, the prototypes are compared with a new input block #1 belonging to an image I of the first type identified by the user (kind of defect or absence of defect). The first counter associated with the closest prototype to this input block #1 is increased and the second one is increased only if the category associated with that prototype is the same as the desired one (category given by the user to characterize the whole image I). At the end of this sub-phase Ib, the "probability" (in the meaning of the present invention) for each prototype of representing a defect is a function of the category of this prototype and of the ratio of the number of times the prototype represented the same category as the desired one (value stored in the second counter) and the number of times this prototype has been the closest one to input block #1 (value stored in the first counter). The characteristic probabilities of all the memorized prototypes are stored in Data base 1. All operations performed during sub-phase Ib will be now detailed by reference to FIG. 4B.

Now turning to FIG. 4B, there are described the essential steps of box 31 of FIG. 3 in the form of an algorithm still referenced 31 which aims to calculate this "probability" for each prototype. Images of the first type that will be used for that second sub-phase Ib are still stored in the Learning Database (i.e. images $I_1$). An input block #1 is generated (step 44) and sent to the first ANN in order to determine the closest prototypes (step 45). Note that step 44 is identical to step 36 as described above by reference to FIG. 4A. Now the increments of the two counters associated with the closest prototype are evaluated using the distance determined in step 45 and the category given by the user for the whole image (step 46). These two counters are increased (step 47), and their contents are stored in Data base 1. A test is then performed to determine if this step corresponds to the end of the image (step 48). If yes, the user may select another image and define its associated category (step 49). If not, the above sequence of steps 44 to 47 is repeated. The process stops when the user thinks that he has presented a sufficient number of images to the first ANN to permit a full understanding of the defects. At the end of this sub-phase referred to as Ib, all the "probabilities" are evaluated using the values stored in the respective pairs of counters.

To clarify the above explanation look once again at the wafer map example. In order to understand better how the probabilities are calculated, imagine wafer 11-3 illustrated in FIG. 2 that has a characteristic defect and compare all its sub-images with all the prototypes stored in the first ANN. For each input block #1 of wafer map 11-3, the two counters associated with each prototype are incremented as described above. As before, this process is continued for other wafer maps of the Learning Data base. Note that generally it is not necessary to process all the wafer maps used in sub-phase Ia.

Figure 7:
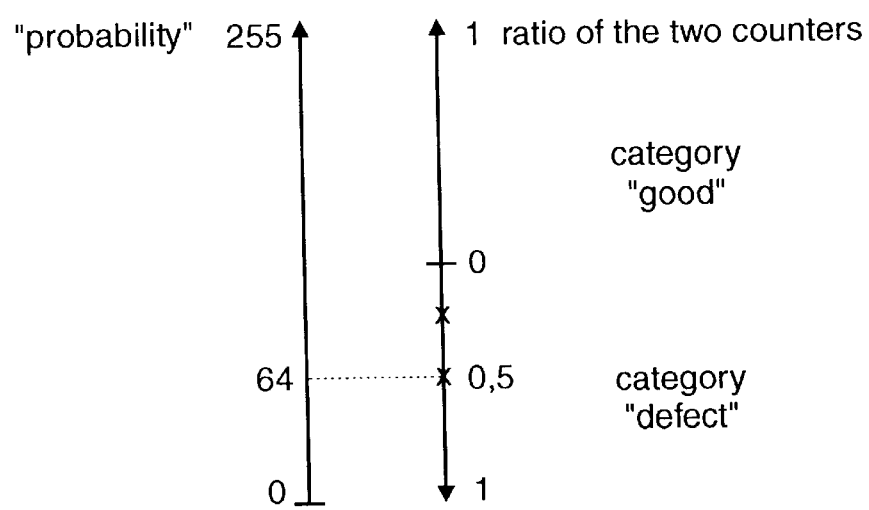
FIG. 7 is a graph showing an example of the correspondence between the ratio of the two counters (depending upon their category) and the "probability" value.

FIG. 7 is a graph which shows the correspondence between the value obtained in making the ratio between the two counters, which ranges between 0 and 1, and the probability, which varies from 0 to 255 depending on whether the category is "good" or "defect".

Therefore, at the end of this process, each prototype has a probability characterizing the confidence degree of its associated category assignment, which is also stored in said Data base 1.

The probabilities stored in Data base 1 can now be used to perform the local analysis on a never before seen image I stored in the Test Data base of the first type (i.e. $I_r$) during a recognition phase (sub-phase Ic). This local analysis is performed in box 32 of FIG. 3 and will now be described in more details in conjunction with FIG. 4C. First, the blank block #1 walks through the new image of the Test Data base step by step to generate the input blocks #1 (step 50). Each input block #1 that is obtained is compared with the prototypes in the first ANN in order to find the closest prototype (step 51). The probability associated with this closest prototype is placed at the corresponding central point of this input block #1 in the resulting image $I'_r$ (step 52). Next, a test is performed to determine whether the end of the image has been reached (step 53). If not, then the above sequence of steps 50 to 53 is repeated; if yes, then the sub-phase Ic is terminated. Thus after walking entirely through said never before seen image in consideration, a new image $I'_r$ of a second type is created, i.e. an image of probabilities based on the calculated probabilities stored in Data base 1. The same description applies to the algorithm enclosed in box 32' to generate image $I'_1$.

Figure 8:
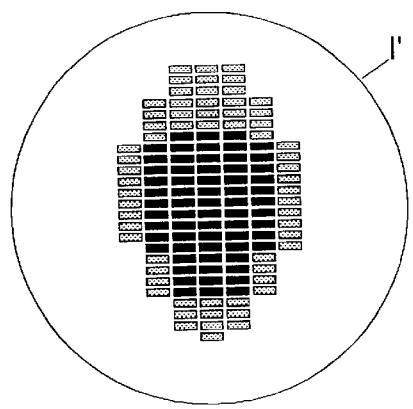
FIG. 8 shows a typical image that is obtained after the local analysis of the wafer map 11-3 of FIG. 2 which is a probabilistic image.

Let us return again to the wafer map example for the sake of illustration and consider the first position of the blank block depicted in FIG. 5 when walking through wafer map 11-3 of FIG. 2. The first input block #1-1 which is generated is sent to the first ANN in order to find the closest prototype. The probability associated to this closest prototype is placed at the corresponding central point of this input block #1 in the resulting image $I'_r$. This process continues until all the input blocks #1 have been analyzed. FIG. 8 shows an example of the new image I' of the second type that was created after all the steps of sub-phase Ic have been completed, i.e. a "pseudo" wafer map which represents the image of probabilities. For the sake of simplicity, the image shown in FIG. 8 has only two levels of probability represented by two colors (grey and black). However according to what has been said above in conjunction with FIG. 7, 256 levels (or more) could have been used as well.

Based on the new image I' of probabilistic values, Phase II may be initiated for their exploitation to produce a final image that is useful for the process engineer. Phase II is comprised of two sub-phases, a learning phase (sub-phase IIa) and a recognition phase (sub-phase IIb). During sub-phase IIa, a new blank block, referred to as blank block #2 is created to examine the probability of its central point and its neighborhood. It is smaller than blank block #1, but once again able to walk through this image I' without falling outside its boundaries. Likewise, this blank block #2 is used to generate input blocks #2. The user now chooses a sub-image, which based on his opinion, characterizes or does not characterize a defect and the kind of defect it represents. This input block #2 is stored as a prototype in the second ANN with the appropriate category (kind of defect or absence of defect) thus allowing the creation of still another data base referenced Data base 2. The categories used to characterize input blocks #2 could be the same, but not necessarily, as those used to characterize input blocks #1. For the sake of simplicity, these categories are the same in the present application. This Data base 2 is used during the defect detection process performed during sub-phase IIb. Blank block #2 walks through the image again, and the input blocks #2 generated therefrom are sent to this second ANN for defect detection. The final image I* is an image of a third type that should clearly display whether or not a defect exists on the image I of the first type and the kind of this defect. This image I* of the third type is thus derived from the image I' of the second type which in turn is derived from the image I of the first type.

Figure 9:
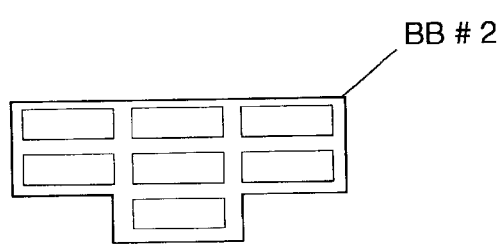
FIG. 9 shows another small "blank block" of a second type (blank block #2) adapted to "walk" through the image of FIG. 8.
Figure 10:
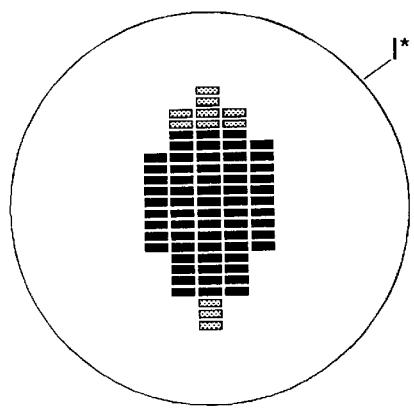
FIG. 10 shows the final image that is obtained after processing the image of FIG. 8 using blank block #2 which points out the potential defects and their locations.

Let us still explain these steps of sub-phases IIa and IIb of Phase II by reference to the wafer map example. The blank block #2 referenced BB#2 in FIG. 9 which includes seven chip locations is created. This blank block #2 will be used to generate input blocks #2 from the images I'. In sub-phase IIa (the learning phase), the user chooses the input blocks #2 from an image $I'_1$ from the Learning Data base which, based upon his opinion, characterizes or not a defect. These input blocks #2 are sent to the second ANN to be stored as prototypes with a category of the kind of defect or absence of defect. During sub-phase IIb (recognition phase), the blank block #2 walks through an image $I'_r$ from the Test data base to generate input blocks #2. The input blocks #2 are compared with the prototypes stored in the second ANN in order to analyze the corresponding wafer map area as representing a defect or not representing a defect and if a defect is detected, to classify it. As a result of analyzing all the input blocks #2 of this image, an image $I^*_r$ is obtained. An example of such an image is represented in FIG. 10. This image provides the localization, classification and the visualization of any potential defect to the process engineer.

For the sake of simplicity, the present method is divided in two logical phases Phase I and Phase II (see FIG. 3). Phase I is the local analysis of the image I of the first type to obtain another image I' of the second type in which each point represents the "probability" of the kind of defect or absence of defect in the corresponding area of image I. Phase II is the defect detection, localization and classification of image I' to obtain the final image I* which shows the defects, their kind and positions. However, when this method is reduced to practice, it is divided in another manner. As a matter of fact, learning sub-phases Ia, Ib and IIa are generally performed only once at the installation or from time to time for maintenance or update purposes to characterize new defects. After these learning sub-phases have been completed, the user (or an automate) has to use only the recognition sub-phases Ic and IIb to detect, localize and classify the defects or more generally any type of anomaly. The present method can be advantageously implemented using the ZISC chips.

U.S. Pat. Nos. 5,621,863, 5,701,397, 5,710,869, 5,717,832, and 5,740,326 jointly owned by IBM Corp. and Guy Paillet are directed to new neuron and artificial neural networks architectures implementing the ROI and KNN algorithms mentioned above. Semiconductor chips incorporating such neuron and neural networks are manufactured and commercialized by IBM Corp. under the ZISC brand. ZISC is a registered Trade Mark of IBM Corp.

Currently when working with ZISC chips, the output consists of two data: the distance and the category of either the selected neurons in the ROI mode or the neuron storing the prototype which is the closest neighbor to the input vector in the KNN mode. It is an essential characteristic of the ZISC chips to have all the distances calculated in parallel. However, quite often as it has been discussed above, it is useful to know each neuron's behavior. For example the frequency with which it responds and the accuracy of its responses. As a matter of fact, thanks to the method of the present invention, this highly desired feature can now be added to the ZISC chips. ZISC chips will now find new ranges of applications while existing ones will be significantly improved.

Figure 11:
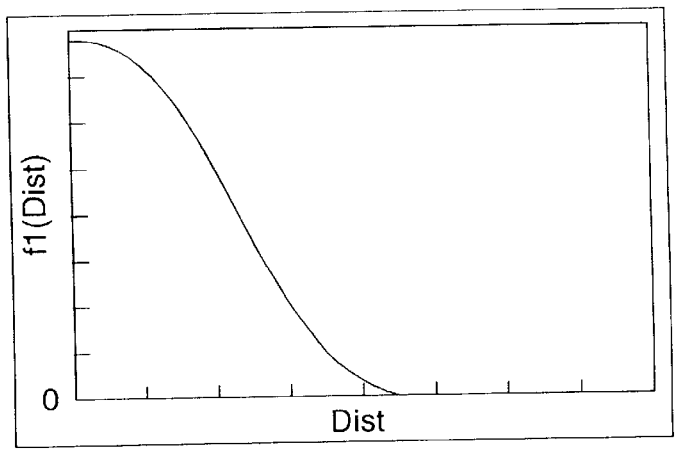
FIG. 11 shows an example of a function that is used to increment the first counter associated to each neuron mentioned which allows the evaluation of the neuron response frequency.

According to the present invention, the method mentioned above involves the implementation of at least 2 counters per neuron to determine the frequency of the neuron's responses and the frequency of their good responses, i.e. their accuracy. The contents of the first counter represents the "frequency" of the neuron's responses. During sub-phase Ib, the augmentation of all the first counters is made in parallel and is based on a function of the distances between the input data and their respective prototypes stored in the neurons of the ZISC chip. In other words, as distances in the ZISC chip are calculated in parallel, all distances between the input data and the prototypes are available at the same time whatever the number of neurons being used. Each neuron $N_i$ uses its distance $Dist_i$ and a function $f1_i$ to determine the incrementation of the content $C1_i$ of its first counter according to equation (1) given below:

$$C1_i(t) = C1_i(t-1) + f1_i(Dist_i(t-1)) \quad (1)$$

where $C1_i(t)$ is the contents of the first counter of the neuron $N_i$ at time t, $Dist_i(t)$ is the distance between the input data and the prototype associated with neuron $N_i$ at time t and $f1_i$ is the function associated with neuron $N_i$. FIG. 11 shows an example of a function f1. With such a function, small distances result in a large augmentation of the counter contents while large distances result in a smaller augmentation.

Along the same lines also during the learning sub-phase Ib, the augmentation of the second counter proportional here to a function of not only the distance as discussed above, but also the difference in the categories of the input data (desired response) and the prototype (observed response) is calculated. Thus upon the assignment of a category to the input data, the difference between its assigned category and the category of the prototypes is calculated. Now, a new function f2 is calculated representing a relationship between each response error (function of the desired category and the obtained one) and the corresponding distances. This function is used to evaluate the increment of the second counter for each neuron according to equation (2) given below:

$$C2_i(t) = C2_i(t-1) + f2_i(Dist_i(t-1), cat_i, cat') \quad (2)$$

where $C2_i(t)$ represents the contents of the second counter of the neuron $N_i$ at time t, $Dist_i(t)$ is the distance between the input data and the prototype associated with neuron $N_i$ at time t, and $f2_i$ is the function used to calculate the increment of the second counter of neuron $N_i$, $cat_i$ and cat' represent the category associated with neuron $N_i$ and the desired category (given by the user) respectively. As with the first counter, this second counter is augmented proportional to the value of this function, and its contents is evaluated in parallel for all the neurons. At the end of this learning sub-phase Ib, certain neurons are more effective then others based upon the contents of their counters.

The description given above has been made by reference to two counters for the sake of simplicity. However, the use of more than two counters in each neuron could be worthwhile in several cases, for instance, when several categories must be associated to each prototype. In such a case, one counter must be used to evaluate the response frequency of each prototype as described above, and one more counter must be used for each category in order to evaluate the accuracy of each prototype to give the "probability" for each category. In this case the desired behavior is that, for each prototype, only one counter presents a good response accuracy (probability). This characteristic means that the prototype is a good representation of the category associated with the counter which presents a good accuracy. Another case which requires the use of more than two counters is when the categories used (more than two) have no order relation. In this case the measure of the accuracy is quite different than the one presented above. The only counters that are incremented are those used to evaluate the response frequency and those which are associated with the desired category (provided by the user during the learning phase). These solutions are not presented in detail hereunder, because they are a generalization of those presented above using the same principles. Counters could also be used to analyze in detail neurons response frequency.

Another important feature which could be used still according to the present invention is the use of several neighbor prototypes instead of only the nearest one. A simple function could be the ponderation of the probabilities relative to the associated distances using the K nearest neighbor prototypes. Such a solution would improve the ANN response accuracy, particularly in image processing.

What is claimed is:

1. A method of detecting anomalies and classifying the anomalies in categories using an artificial neural network (ANN) comprising the steps of:

performing a preliminary learning phase comprising:
creating a blank block, the blank block having a shape that is designed to view each set of data in its totality in a determined number of steps;

stepping each blank block through each image;
generating an input block derived from said blank block for each step where each input block is a binary photograph of the image at each step, each input block having a central point;
storing the representative input blocks for at least a number of steps,
creating a first database using the stored representative input blocks, the first database defining prototypes of a first ANN,
providing a recognition phase comprising:
    calculating the probability of each of said prototypes belonging to defined categories;
    repeating at least once said blank block stepping through each set of data;
    using said prototypes and their associated probabilities to characterize new subsets of data, wherein each subset of data is characterized by subset probabilities, the subset probabilities selected from the group consisting of the K nearest neighbor (KNN) algorithm and a function of KNN;
    replacing the central point of the input blocks with the subset probabilities.

2. An artificial neural network (ANN) comprised of a plurality of neurons implementing a mapping of the input space comprising:

a storage means for storing prototype components in each neuron;

a plurality of counting means to compute the distances between an input vector presented to the ANN and the prototypes stored in each neuron; and, a specific storage means for storing data relative to the neuron behavior.

3. The ANN of claim 2 wherein at least two of said counting means comprise two counters, a first counter to count the neuron's response accuracy and a second counter to count the neuron's response frequency.

* * * * *